July 6, 1926.

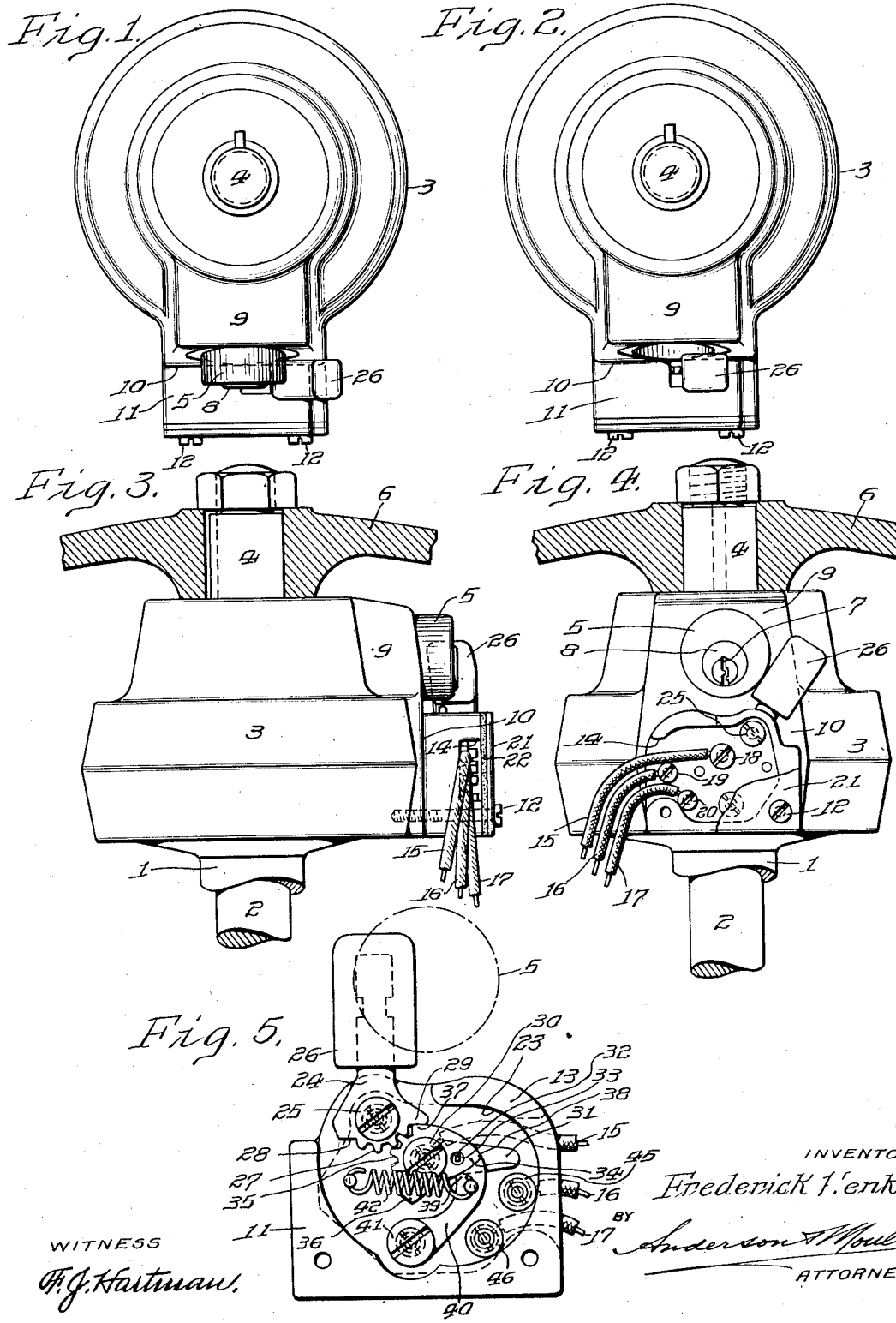

F. HENKE 1,591,164

AUTOMATIC SAFETY DEVICE

Filed May 6, 1924   2 Sheets-Sheet 2

INVENTOR
Frederick Henke.

WITNESS
F. J. Hartman.

BY Anderson & Moulton
ATTORNEYS

Patented July 6, 1926.

1,591,164

UNITED STATES PATENT OFFICE.

FREDERICK HENKE, OF PHILADELPHIA, PENNSYLVANIA, ASSIGNOR TO FOX AUTOMOTIVE PRODUCTS CORPORATION, A CORPORATION OF DELAWARE.

AUTOMATIC SAFETY DEVICE.

Application filed May 6, 1924. Serial No. 711,348.

My invention relates to automatic safety devices, and with particularity to those devices which will automatically and with certainty indicate that a machine or other object which should be kept locked when not in use or operation is so locked, with the idea of preventing an operator or responsible party from inadvertently leaving the machine or object in an unlocked condition.

A further object of my invention is to provide the ignition circuits of an automobile or similar device with a circuit maker and breaker or switch which will automatically break the ignition circuit used in running the car when, and only when the car is locked, and which will maintain closed said running ignition circuit so long as the car is unlocked.

A further object of my invention is to prevent the operator of a car from breaking the running ignition circuit to stop the operation of the engine without first locking the car.

A further object of my invention is to provide a safety device for a car which is of such a nature that the car is in an unlocked condition when and by reason of the fact that the owner is notified of the fact that the engine is running.

Further objects of my invention are to provide a small simple, unobtrusive switch which is adapted to operate in conjunction with locks already on the market, to prevent the breaking of the ignition circuit of an automobile so long as the car is in an unlocked condition and which will be operative to break the circuits only when the car is locked.

Other objects of my invention will appear in the specification and claims below.

In the drawings forming a part of the specification and in which the same reference characters and employed throughout the various views to indicate the same parts, I have illustrated one embodiment of my invention as applied to and cooperating with the steering wheel lock of an automobile.

In the drawings Fig. 1 is a plan view of the steering post housing with the steering wheel removed and with my safety device attached thereto and cooperating with the lock, the parts being shown in the positions occupied by them when the car is in unlocked condition.

Fig. 2 is a view similar to Fig 1 but with the parts shown in a locked condition.

Fig. 3 is a side elevational view of the steering shaft, a fragment of the steering post, the lock housing or casing and the circuit making and breaking device mounted thereon, a fragment of the steering wheel being shown in section and secured to the steering shaft.

Fig. 4 is a front view of the mechanism shown in Fig. 3.

Fig. 5 is a view of the back or rear side of the snap switch, the parts being shown in circuit breaking position.

Figure 6:
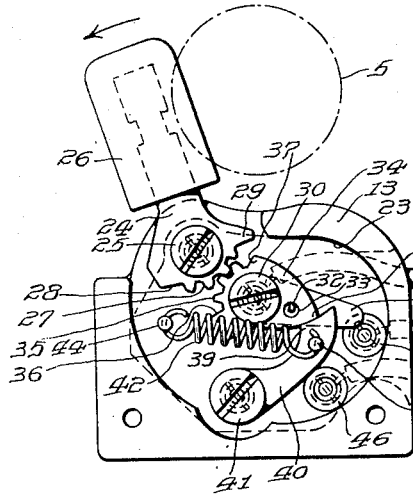
Fig. 6 shows the switch lever being turned through a comparatively small angle and the movable contact point upon the first stationary contact point of the switch.

Within the steering post 1 of an automobile is mounted the steering shaft 2 and at the top of the steering post 1 is secured, in any convenient and usual manner, the housing or casing 3 in which is the gearing (not shown) between the steering wheel shaft 4 and the steering shaft 2, and in which is also housed the steering wheel lock of any well-known and usual type, wherein a lock member 5 of the lock is mounted to slide longitudinally for a limited distance in and out of the casing 3. When the lock member 5 is in the position shown in Figs. 1, 3 and 4, the steering wheel shaft or steering shaft is unlocked so that the steering shaft 2 may be freely turned by turning the hand or steering wheel 6 and when the locking member is pushed into the casing or housing 3 so that the outer end thereof does not project substantially beyond the outer surface of said casing, and the key is withdrawn from the keyhole 7 of the key barrel 8, the steering wheel and shaft are locked. This form of lock is well-known and need not be described with any further particularity except to say that in this type of lock the key cannot be removed until the lock member 5 is forced into the casing or housing 3 (as shown in Fig. 2) the limit of its inward movement and until the outer end thereof is substantially flush or slightly below the surface of the casing or housing 3, and the steering wheel or shaft is in locked condition until the lock member 5 is drawn outwardly to the limit of its motion in that direction. The member 5 then has virtually only two positions in which it may remain, namely, fully withdrawn or fully pushed in. The key may or may not be withdrawable from the key barrel 8 when the lock member 5 is in its outermost position and the steering wheel and shaft are unlocked.

The casing or housing 3 is preferably provided with a projection 9 in which the lock member 5 is mounted to slide longitudinally for a limited distance as above described, and immediately below this projection 9, the casing is preferably provided with a spot or flat surface on which is mounted a switch-block or switch casing 11 preferably made of suitable insulating material and secured to said spot or surface in any suitable manner as by screws 12, 12.

The front side of the switch casing or block 11 is preferably provided with a marginal ridge or wall 13, a space 14 being left in the wall to permit of the passage of the insulated wires or leads 15, 16, 17 of the ignition circuits to the binding posts 18, 19, 20 to which said wires or leads are respectively attached and electrically connected. A front plate 21 preferably covers the front side of the switch-block and rests on the top of the marginal wall 13. If the plate 21 be of metal, a sheet 22 of insulating material should be interposed between the cover and the binding posts 18, 19, 20 and the bare ends of the wires 15, 16 and 17 so as to prevent any short circuiting of the ignition circuits.

Figs. 5 to 9 are similar views looking into the back or rear side of the switch-block or switch casing 11, plainly showing the construction and operation of the movable switch member and of the automatic snap mechanism for throwing the switch member into either of two positions in which the switch member may normally be, and the relation of the switch operating handle to the projecting lock member 5.

The rear side of the switch-block or housing 11 is provided with a recess 23 in which the manually operated member 24 is pivotally mounted on a pivot pin 25. The outer end of the member 24 is provided with a handle 26 preferably of insulating material molded thereon, so that when the said handle rests against the lock member 5, as will be later described, there can be no short-circuiting of the ignition circuits therethrough.

The operating member 24 is preferably provided on its inner end with a gear toothed segment 27, the teeth of which terminate on one side in an abutment 28 and on the other side in a projection or abutment 29.

Pivotally mounted on a pin or screw 30 and threaded into and in electrical contact with the binding post 18, which is embedded in the block 11 and extends from the front thereof through to the bottom of the recess 23, is a movable contact point or arm 31 preferably having a small pin or lock 32 projecting upwardly from the face thereof and loosely fitting into a hole 33 in a heart shaped cam member 34 also pivotally mounted to turn on said screw or pin 30 and provided with a gear toothed segment 35 meshing with the segment 27 on the operating lever 24 and having abutments 36 and 37 at the opposite ends of the toothed segment 35.

Figure 8:
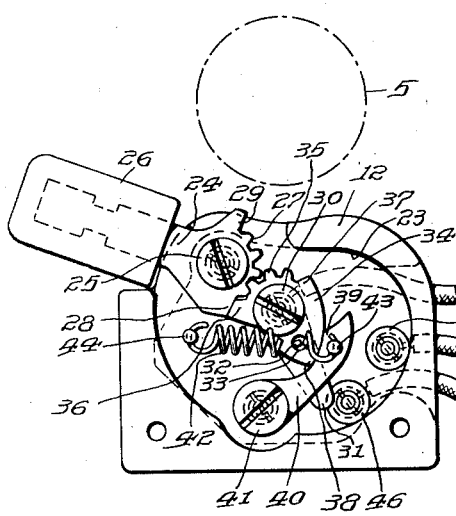
Fig. 8 shows the handle of the switch and the parts operated thereby in one extreme position or opposite the position shown in Fig. 5.
Figure 9:
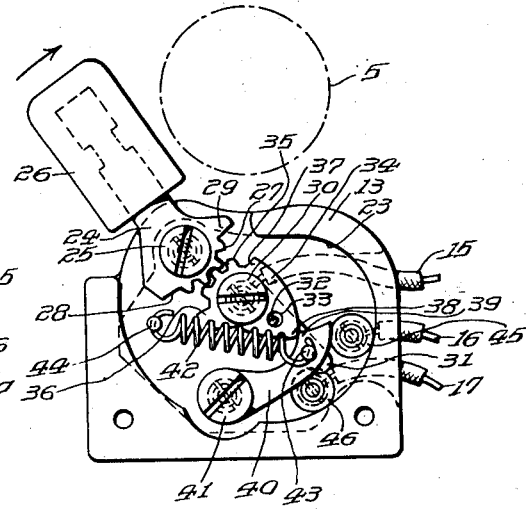
Fig. 9 is a view similar to Fig. 7 but with the parts in the relation which they bear to each other when the lever is moved from the position shown in Fig. 8 to that shown in Fig. 9.

The engagement of the abutments 29 and 37 serve to limit the rotational movement of the operating lever 24, the cam 34 and the movable contact arm 31 in one direction and the engagement of the abutments 28 and 36 similarly operates to limit the rotational movement of the said parts in the opposite direction and will clearly appear as by reference to Figs. 5 and 8.

The heart shaped cam member 34 is provided with a relatively sharp edge 38 to coact with a similar sharp edge 39 of the snap, the switch throwing mechanism comprising a lever 40 pivoted on a pin 41 rigidly mounted in the bottom of the recess 23 of the said block 11 and a tension spring 42 one end of which is secured to a pin or post 43 projecting from the lever 40 and the other end of which is secured to a pin or post 44 projecting upwardly from the bottom of the recess 23 of the block 11.

Also embedded in the block 11 are two metallic stationary contact points 45 and 46 which are respectively in electrical communication or contact with the binding posts 19 and 20 on the front side of the block. These two stationary contact points 45 and 46 are disposed substantially equidistant from the center of the pin or pivot 25 and are in the path of the movement of the end of the movable contact point or arm 31.

The normal operation of the snap switch and circuit breaker will now be readily understood. In Fig. 5 the parts are shown in circuit breaking condition. The pressure of the lever on one side of the heart shaped cam 38 under the tension of the spring 42 holds the abutments 29 and 37 in engagement and the end of the movable contact arm 31 out of engagement with the stationary contact point 45. Even with the loose fit of the pin or lug 32 in the hole 33 of the heart shaped cam does not permit of the end of the lever 31 from contacting with the stationary contact point 45. In this position all of the ignition circuits are broken through the switch.

As the manually movable member 24 is now turned by its handle 26 to the position shown in Fig. 6, the heart shaped cam 34 forces the lever 40 outwardly against the tension of the spring 42, the contact arm 31 is moved into engagement with the contact 45 and the circuit from wire 16 through the contact arm 31 and wire 15 is completed. If now the operator were to release the handle, the spring 42 and lever 40 would immediately return the parts to the position shown in Fig. 5 and break the circuits.

Figure 7:
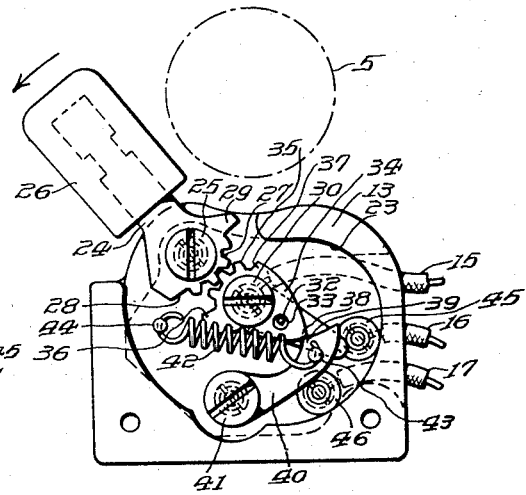
Fig. 7 shows the handle thrown a little further showing the relative positions of the movable contact point, the stationary contact point, the cam and the snap mechanism at the critical point in the throw of the handle.

In Fig. 7, the handle 26 is shown as thrown still further so that the sharp edge 38 of the heart shaped cam 34 is just about to pass over the sharp edge 39 of the lever 40. It is to be observed that in this position the outer end of the movable contact arm 31 is still in engagement with the stationary contact point 45, but if the operator having moved the handle 26 to the position shown in Fig. 7 were then to release it the sharp edges 38 and 39 would not permit the parts to remain in that position. In other words it is impossible to hold the two sharp edges in engagement or absolute alinement. The sharp edge 39 of the lever 40 will be either on one or the other side of the sharp edge 38 on the heart shaped cam with the result that the tension of the spring will either throw the parts back to the position shown in Fig. 5 to break the circuit if the handle is released or will throw the parts into the position shown in Fig. 8 wherein the outer end of the movable contact arm 31 is in engagement with the stationary contact point 46, because the instant the knife edges are forced over each other by the handle 26, the spring 42 and lever 40 instantaneously advance the cam 34, independently of the lever 24, on account of the back lash between the toothed segments 27 and 35, to snap the arm 31 into engagement with the contact 46. If now the operator were to move the handle 26 from the position shown in Fig. 8 to that shown in Fig. 9 the loose connection between the pin 32 and hole 33 again permits the contact arm 31 to drag or trail a little behind the heart shaped cam and that when the cam 34 and lever 40 are again brought into position shown in Fig. 9 with the sharp edges about to pass each other, the arm 31 will still be in contact with the stationary contact point 45. But as soon as the said edges pass each other, the spring 42 will snap the parts into the position shown in Fig. 5 over the contact 45 into circuit breaking position.

It is therefore practically impossible for the operator to hold the handle 26 in any position wherein the arm 31 is between and out of contact with both contact points 45 and 46.

In the normal operation of the switch, the movable contact arm 31, when the handle 26 is released, will be in one of two positions; either that shown in Fig. 5 with all the ignition circuits broken or that shown in Fig. 8 wherein the ignition circuit leading from the stationary contact point 46 is closed.

The switch block 11 and the operating member 24 thereof are so disposed with respect to the lock member 5 that when the lock member 5 is pushed into its housing or casing 3 it is out of the path of movement of the operating member 24. In this position the steering wheel and steering shaft are locked, and the handle 26 may be freely swung to hold the movable contact arm 31 either in the position shown in Fig. 5 or the position shown in Fig. 8, but when the lock member 5 is drawn out to unlock the steering wheel and steering shaft, the lever or handle 26 must be drawn out of the path of the movement of said lock member 5 and the only position in which it can be thrown and remain out of the path of the lock member 5 is that shown in Fig. 8.

In the embodiment of my invention illustrated in the drawings and herein described, the wire 17 is the wire connected to the battery of the ignition circuit and the wire 16 is connected to the magneto ignition circuit and the wire 15 is the return wire to either the battery or the magneto.

Assuming then the parts to be in the position shown in Fig. 5 and remembering that we are looking at the rear side of the switch and assuming that the car has been properly locked and that the lock member 5 is pushed into the recess or projection 9 of the casing 3 as shown in Fig. 2 to start the car, the operator throws the lever or handle 26 and member 24 over into the position shown in Fig. 8 which closes the ignition circuit through the battery. When he releases the handle 26, the parts will remain in the position shown in Fig. 8. He is now free to insert a key in the keyhole 7, turn the key barrel 8 until the tumblers release the lock 5, whereupon he then may draw the lock member 5 outwardly to the limit of its path of motion, that is to say, up into the position shown in Fig. 3. The battery circuit is now closed, the steering wheel is unlocked and the car may be operated. In the systems wherein there are two ignition circuits, one from the battery and one from the magneto, the magneto circuit is the one which is used under running conditions, and as soon as the motor is started with the battery current, the operator will throw the handle 26 back toward the locking member 5. That will be the position shown in Fig. 4. The sharp edge 38 of the heart shaped cam 34 will have passed over the sharp edge 39 of the lever 40, and the spring 42 and lever 40 will have thrown the outer end of the contact arm 31 into contact with the stationary contact 45 and will hold the handle 26 against the projecting surface of the lock member 5. In this way, the ignition circuit will be closed through the magneto. So long as the steering wheel and shaft are unlocked, the operator cannot do anything but throw the movable contact arm back and forth into engagement with the stationary contact point 45 or the stationary contact point 46. The arm 31 will be instantaneously snapped from the stationary contact point 45 to the stationary point 46 or vice versa. It cannot remain between the two contact points and both ignition circuits cannot be simultaneously broken. The only way in which the operator may break both ignition circuits is by forcing the lock member 5 inwardly and locking it and withdrawing the key, whereupon the lock member 5 and key will be out of the path of the movement of the handle 26 and the handle may be thrown to the position shown in Fig. 5. If the operator stops the car with the handle 26 in engagement with the lock member 5 and then forces the lock member 5 inwardly out of the path of the movement of the handle 26 and withdraws the key, the spring 42 will operate to automatically throw the handle and the parts connected therewith into the position shown in Fig. 5.

From the above description of this device it will now be apparent that the operator of an automobile provided with the above safety device must know that whenever, after running his car, he leaves it with the engine stopped, the car must be locked. Generally speaking, the running of the engine is notice to the operator that the car is unlocked, for in order to stop the engine from running, it is necessary to lock the car.

I have described my invention as particularly adapted for use with two circuits one of which is a magneto circuit and the other of which is a battery circuit, but in those systems wherein a single source of electricity is employed in the ignition circuit, as for instance, a storage battery charged by a magneto and provided with an automatic device wherein the circuit is automatically switched from battery to magneto after the engine is started, the wire 17 may be omitted and the contact point 45 alone used. In that case, however, the rotary motion of the heart shaped cam should be made considerably less than that above described so that the sharp edge 38 thereof can never reach and pass over the sharp edge 39 of the lever 40 so that the normal position of the arm 31 will be that shown in Fig. 5 and so that when the lever or handle 26 is thrown to one side to permit the withdrawal of the lock member 5, and is then released, the spring 42 and lever 40 will turn the handle 26 back into engagement with the lock member 5 and the movable arm 31 will remain in engagement with the stationary contact point 45.

It is to be noted that in installing my safety device in an automobile circuit the ordinary manually operated switch for making and breaking the ignition circuits is removed, the wires are spliced or joined at that point and the switch forming a part of my safety device and described above, is mounted on the steering wheel column in such a manner as to permit the handle or operating lever to cooperate with the lock member of the lock.

Other locks than a steering wheel lock may be used in connection with my switch above described provided that lock has or is provided with a lock member of some kind which will always project into the path of some part of the switch operating member when the lock is unlocked and will move out of said path to permit the circuit to be broken through the switch when the lock is locked.

The backlash or loose pin and hole connection between the lever 24 and the cam 34 is made sufficient to permit the snap mechanism to automatically advance the cam enough to insure the throw of the contact arm from one contact point to the other, the instant the sharp edges 38 and 39 pass each other, and any suitable loose connection may be so employed.

But it is not to be understood that the installation of my invention into an ignition circuit will prevent an operator from making a running test of the engine with the car locked for when the car is locked the handle 26 may be thrown to the position shown in Fig. 8 to close the battery circuit, but running tests are not frequently made and the operator is at or beside the car at such times. This then will not change the general proposition that when an operator gets out of his car and leaves it with the engine running the car is unlocked, and that when the engine is stopped the car is locked. The operator cannot break the ignition circuit to stop the engine until he has first locked the car.

The switch mechanism herein disclosed and forming a part of the invention herein claimed forms the subject-matter of my copending application, Serial Number 65,645, filed October 29, 1925.

Having thus described my invention, what

I claim and desire to protect by Letters Patent of the United States, is:—

1. In a safety device the combination with an electric snap switch comprising a movable switch member, a lever by which said switch member is manually operated, a stationary contact point and means normally operative to move and hold said movable member out of contact with said stationary contact member, of a lock including a lock member projecting into the path of movement of said lever when said lock is unlocked and operative to retain said movable switch member in contact with said stationary contact, so long as said lock is unlocked and movable out of the said path of movement of said lever when said lock is locked, said means being automatically operative to move said switch member out of contact with said stationary contact when said lock member is moved to locked position.

2. In a safety device for an automobile lock, the combination with a switch having a stationary contact in the ignition circuit of the automobile, a movable contact arm, a lever for manually moving said arm from circuit breaking position into electric contact with said stationary point to close the ignition circuit, means normally operative to automatically return said movable contact arm to circuit breaking position when said lever is released, of a lock for the automobile including a lock member projecting into the path of movement of said lever whenever said lock is unlocked and operative to prevent said automatic means from moving said arm to circuit breaking position, and moving out of the path of said lever when said lock is locked to permit said automatic means to operate.

3. In a safety device, the combination with a snap switch having two stationary contact points, a switch member and a handle by the manual operation of which said switch member is normally snapped from one of said contact points to circuit breaking position and vice versa, said switch member making momentary contact with the other contact point in its movement, of a lock having a member extending into the path of movement of said handle whenever said lock is unlocked, and out of the said path when said lock is locked and operative when said lock is unlocked to retain said switch member in electrical contact with said other stationary contact point.

4. In a safety device for an automobile lock, the combination with a snap switch for the running ignition circuit of the automobile, said switch being provided with a circuit making and breaking arm and with means normally operative to automatically throw said arm to circuit breaking position, of a lock for the automobile provided with a member cooperating with said switch and operative to restrain said means from operating said arm to break said circuit so long as the said lock is unlocked and inoperative to prevent said means from operating to break the said circuit when said lock is locked.

5. In an ignition system for an automobile comprising a battery circuit and a magneto circuit, the combination with a switch having a stationary battery-contact point and a stationary magneto-contact point and a movable switch member, and a lever by the manual operation of which said switch member is automatically snapped from said battery contact point to circuit breaking position making momentary contact with said magneto contact point in so moving from one to the other of said positions, of a lock having a lock member extending into the path of movement of said lever whenever said lock is unlocked and operative to prevent the movement of said switch member to circuit breaking position so long as said lock is unlocked.

6. In a safety device for automobiles, the combination with a lock having a lock member which projects when the lock is unlocked and does not project when locked, of an electric snap switch comprising a switch member, a battery circuit contact, a magnet circuit contact and a lever by the manual operation of which said switch member normally automatically snaps from said battery contact over said magneto contact to circuit breaking position, said lock member extending into the path of movement of said lever when said lock is unlocked to engage said lever and retain said switch member on said magneto contact and to prevent said switch member from moving to circuit breaking position so long as said lock is unlocked.

7. In a safety device, the combination with a snap switch having a stationary battery circuit contact point, a stationary magneto circuit contact point, a movable switch member, a lever by the manual operation of which said switch is operated and a snap mechanism operative to normally automatically throw said switch member to either said battery circuit contact or to circuit breaking position and to hold said switch member in said positions, said switch member sweeping over said magneto circuit contact in moving to either of said positions, of a lock having a member extending into the path of said lever when said lock is unlocked and operative to prevent said switch member from moving from said magneto circuit contact into circuit breaking position so long as said lock is unlocked and moved out of the path of said lever when said lock is locked, whereby said snap mechanism is operative to throw said switch member from said magneto circuit contact to circuit breaking position.

8. In an ignition system for an automobile comprising a battery circuit and a magneto circuit, the combination with a switch having a stationary battery-contact point, a stationary magneto-contact point, a movable contact arm and an operating member by the manual operation of which said arm may be moved from either of said contact points towards the other of said contact points, of a lock having a member projecting into the path of movement of said operating member when the car is unlocked, to prevent said contact arm from being moved to circuit breaking position while said car is unlocked, and means to automatically instantaneously snap said arm from the contact point over which it is being moved by said operating member into engagement with the other contact point before said operating member is moved sufficiently to separate said arm from the said contact point over which it is being moved by said operating member.

9. In a safety device, the combination with an electric switch having two stationary contact points, a switch arm, a switch operating member by the manual operation of which said switch arm is thrown from one of said contact points into circuit breaking position and vice versa, said switch arm normally making momentary contact with the other stationary contact point in its movement, of a lock having a part thereof extending into the path of movement of said operating member whenever said lock is unlocked and out of said path when said lock is locked, and operative when said lock is unlocked to retain said switch arm in electrical contact with said other contact point.

10. In an ignition system for an automobile comprising a battery current and a generator current, the combination with a switch having a stationary battery contact point, a stationary generator contact point, a movable switch arm and a switch operating member by the manual operation of which said arm is moved from said battery contact point to circuit breaking position, said arm passing over and momentarily making contact with said magneto contact point in so moving from one to the other of said positions, of a lock having a part thereof extending into the path of said operating member whenever said lock is unlocked and operative to prevent the movement of said switch arm to circuit breaking position so long as said lock is unlocked.

11. In a safety device, the combination with an electric switch comprising a movable switch member, an operating member by which said switch member is manually operated, a stationary contact point and means normally operated to move and hold said movable switch member out of contact with said stationary contact member, of a lock including a part projecting into the path of movement of said operating member when said lock is unlocked and operative to retain said movable switch member in contact with said stationary contact so long as said lock is unlocked and movable out of the said path of movement of said operating member when said lock is locked, said means being automatically operative to move said switch member out of contact with said stationary contact when said lock member is moved to locked position.

In witness whereof, I have hereunto set my hand this fifth day of May, 1924.

FREDERICK HENKE.